United States Patent
Uno et al.

(10) Patent No.: US 8,388,240 B2
(45) Date of Patent: Mar. 5, 2013

(54) RECEPTACLE ATTACHED WITH OPTICAL ISOLATOR AND METHOD THEREOF

(75) Inventors: Yoshinobu Uno, Tokyo (JP); Kenji Yamauchi, Tokyo (JP); Yuzuru Hakoda, Tokyo (JP); Yoshimasa Hidaka, Tokyo (JP); Masahiro Saito, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 626 days.

(21) Appl. No.: 12/096,240

(22) PCT Filed: Dec. 14, 2006

(86) PCT No.: PCT/JP2006/324947
§ 371 (c)(1),
(2), (4) Date: Jan. 20, 2011

(87) PCT Pub. No.: WO2007/069688
PCT Pub. Date: Jun. 21, 2007

(65) Prior Publication Data
US 2011/0170830 A1    Jul. 14, 2011

(30) Foreign Application Priority Data
Dec. 16, 2005    (JP) ................................. 2005-362623

(51) Int. Cl.
*G02B 6/36* (2006.01)
*G02B 6/00* (2006.01)

(52) U.S. Cl. ................................ 385/92; 385/88; 385/11

(58) Field of Classification Search ........................ None
See application file for complete search history.

(56) References Cited

U.S. PATENT DOCUMENTS

| | | | | |
|---|---|---|---|---|
| 5,359,689 | A * | 10/1994 | Iwatsuka et al. ................ | 385/73 |
| 5,841,922 | A * | 11/1998 | Iwatsuka et al. ................ | 385/76 |
| 6,577,779 | B2 * | 6/2003 | Watanabe ........................ | 385/11 |
| 6,599,023 | B2 * | 7/2003 | Yu et al. ........................... | 385/73 |
| 6,872,012 | B2 * | 3/2005 | Watanabe ........................ | 385/94 |

(Continued)

FOREIGN PATENT DOCUMENTS

| | | |
|---|---|---|
| JP | 10133146 | 5/1998 |
| JP | 11167085 | 6/1999 |

(Continued)

OTHER PUBLICATIONS

International Search Report PCT/JP2006/324947, Mar. 20, 2007.

*Primary Examiner* — Rhonda Peace
(74) *Attorney, Agent, or Firm* — Studebaker & Brackett PC; Donald R. Studebaker (57) ABSTRACT

Provided are a receptacle attached with an optical isolator and a manufacturing method thereof, capable of easily performing position alignment among an end surface of a magnet, an end surface of a fiber stub, and a polarization plane of a polarizer and dimension calculating of the optical isolator without an increase in the number of parts. The optical isolator is constructed by fitting a fiber stub into which an optical fiber is inserted and of which end surface is formed to be slanted with a predetermined angle into a ferrule holder, by forming an end surface of the magnet to be slanted with the same angle as the predetermined angle, and by fixing the optical isolator element to the magnet. The receptacle attached with an optical isolator is constructed by integrally fixing the optical isolator to the end surface of the fiber stub by fitting the optical isolator into an inner diameter portion of the ferrule holder.

2 Claims, 6 Drawing Sheets

U.S. PATENT DOCUMENTS

| | | | |
|---|---|---|---|
| 6,906,843 B2 * | 6/2005 | Nagasawa et al. | 359/280 |
| 7,374,346 B2 * | 5/2008 | Tanaka et al. | 385/88 |
| 2001/0012422 A1 * | 8/2001 | Watanabe | 385/11 |
| 2002/0159149 A1 * | 10/2002 | Zhu et al. | 359/484 |
| 2005/0207710 A1 | 9/2005 | Tanaka et al. | 385/78 |
| 2011/0170830 A1 * | 7/2011 | Uno et al. | 385/88 |

FOREIGN PATENT DOCUMENTS

| | | |
|---|---|---|
| JP | 2001215354 | 8/2001 |
| JP | 2003075679 | 3/2003 |
| JP | 2003329973 | 11/2003 |
| JP | 2004093695 | 3/2004 |

\* cited by examiner

RECEPTACLE ATTACHED WITH OPTICAL ISOLATOR AND METHOD THEREOF

TECHNICAL FIELD

The present invention relates to a receptacle attached with an optical isolator which is mainly used as a passive optical device such as an optical communication module, a semiconductor laser module, and an optical amplifier in an optical communication system and is capable of preventing optical feedback to a laser diode source or occurrence of optical resonance in an inner portion of the optical amplifier.

RELATED ART

Figure 6:
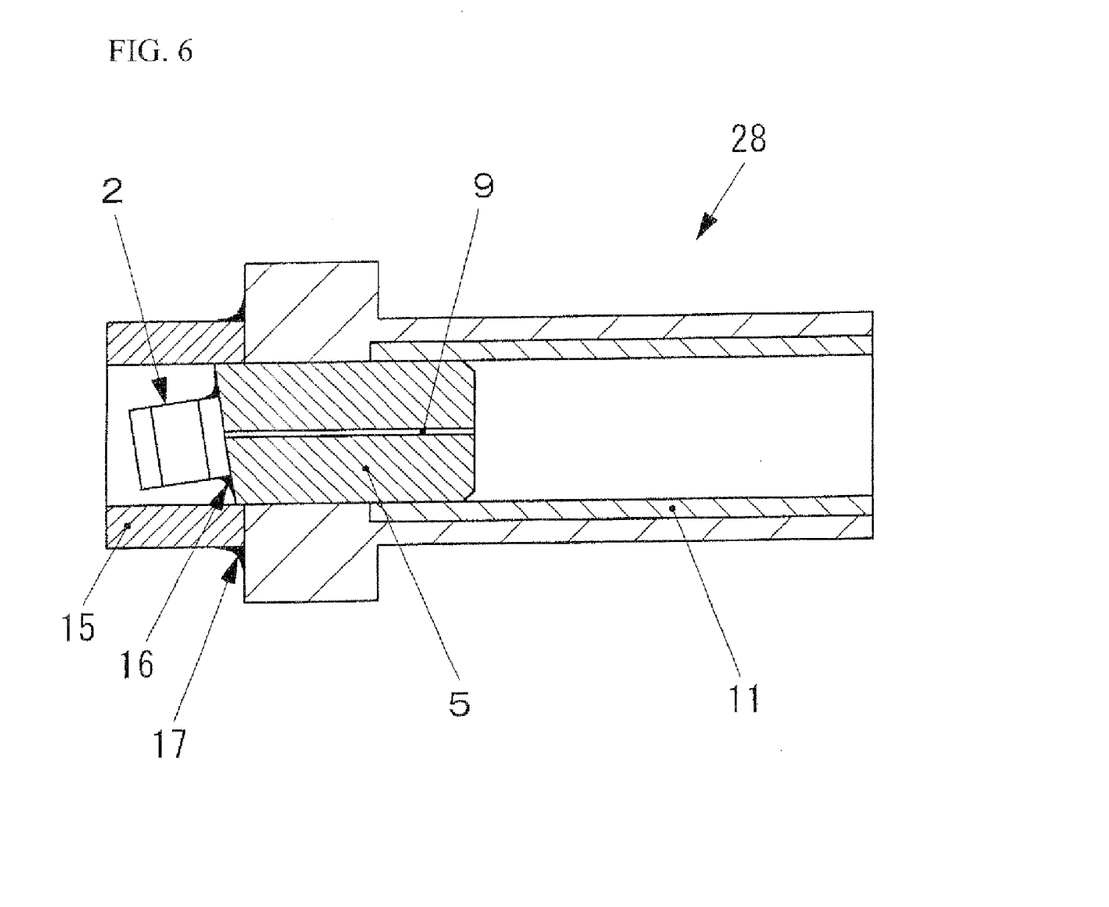
FIG. 6 is a schematic view illustrating an example of the conventional receptacle attached with an optical isolator.

A receptacle attached with an optical isolator is formed by fixing an optical isolator to a receptacle. As an example, a receptacle shown in FIG. 6 is disclosed in Patent Document 1. In the receptacle 28 provided with an optical isolator shown in FIG. 6, the optical isolator 2 constructed with a polarizer and a Faraday rotator is fixedly adhered to an end surface of a slant-polished side of a fiber stub 5 with an adhesive 16. In addition, a cylindrical magnet 15 is fixedly adhered to the receptacle 7 with an adhesive 17 in order to saturatedly magnetize the Faraday rotator around the optical isolator element.

[Patent Document 1] Japanese Patent Application Publication No. 2003-75679 (Pages 3-4, FIG. 1 (b))

The optical isolator shown in FIG. 6 is referred to as "one-stage type" optical isolator. The optical isolator is constructed by facing two polarizers with an relative angle of about 45° between polarization directions, by disposing one Faraday rotator having a thickness corresponding to a Faraday rotation angle of about 45° at a predetermined wavelength under a saturated magnetic field between the polarizers, and by disposing a magnet 15 for saturatedly magnetizing the Faraday rotator in the vicinity of the Faraday rotator. The optical isolator has a function of transmitting forward light and blocking backward light with a high-loss characteristic (backward loss).

A slant polishing process is performed on an end surface of the optical fiber 9 together with the ferrule to form a mirror surface with a slanted angle ranging from 4° to 15° with respect to a plane perpendicular to an optical-signal incident axis in order to prevent reflection on the end surface.

In addition, there is disclosed another type of a receptacle attached with an optical isolator, where positioning of an optical isolator element is performed by inscribing corners of the optical isolator element in an inner circumference of a cylindrical magnet fixed on an end surface of a ferrule (for example, refer to Patent Document 2).

[Patent Document 2] Japanese Patent Application Publication No. H10-133146 (Pages 2-3, FIG. 1)

Figure 7:
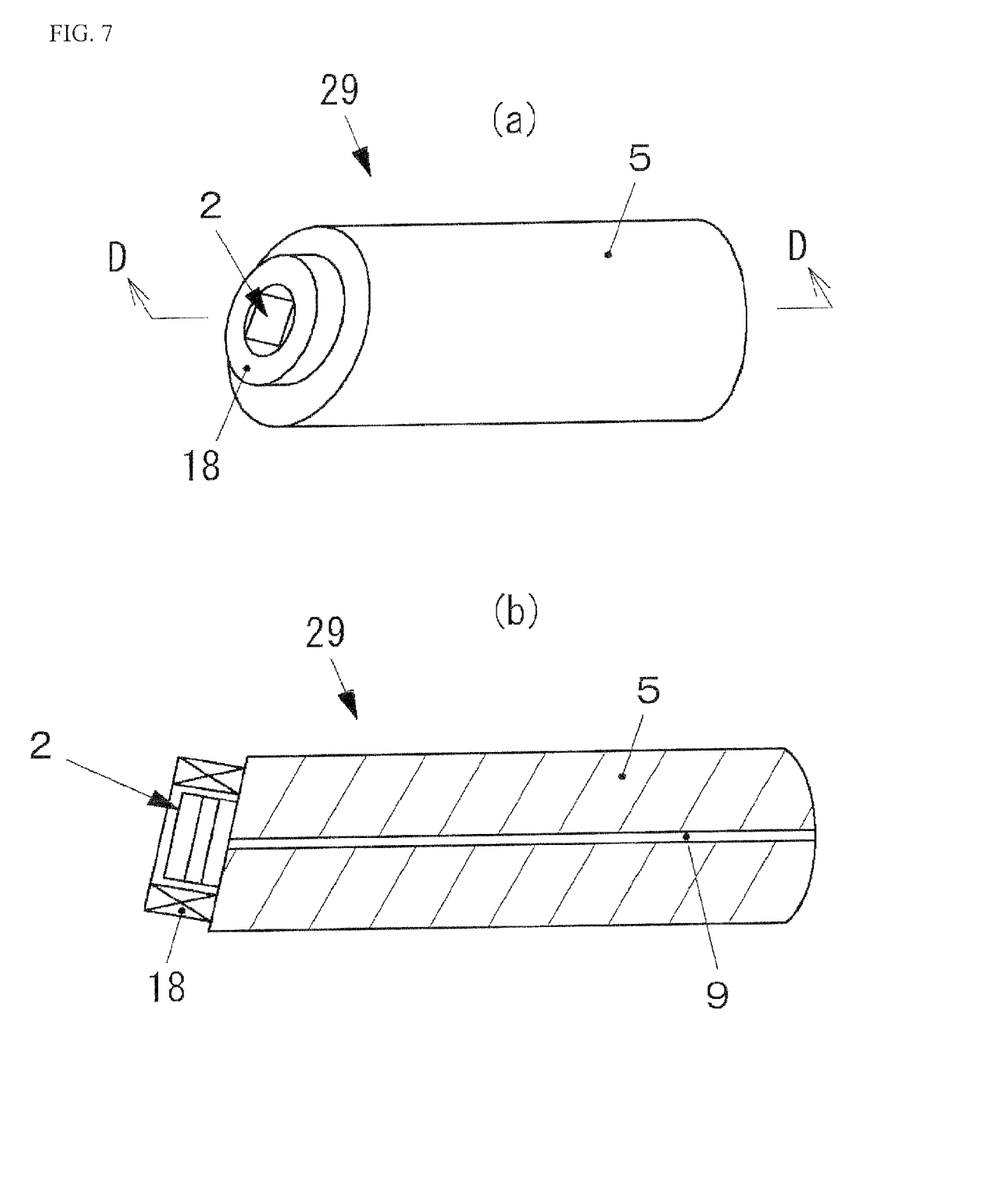

As shown in FIG. 7, the receptacle 29 attached with an optical isolator disclosed in Patent Document 2 is constructed by forming one end of a fiber stub 5 which is made of a ceramic and inserted with an optical fiber 9 in a slanted shape (hereinafter, if needed, referred as a slanted surface) and the other end thereof in a spherical shape and by adhering an optical isolator element 2 and a magnet 18 surrounding the optical isolator element to apply a saturated magnetic field on the slanted surface with an adhesive or glass of low melting point. In this case, the side of optical isolator element 2 is defined as an incident side.

In the receptacle 29 attached with an optical isolator shown in FIG. 7, since the small-sized optical isolator element 2 and the fiber stub 5 are integrally constructed, the entire receptacle can be constructed in a compact structure. In addition, since components thereof are integrated through adhesion, the number of parts for mounting modules can be reduced, and a construction of an assembled system can be simplified, so that alignment for assembling can be easily obtained.

Figure 8:
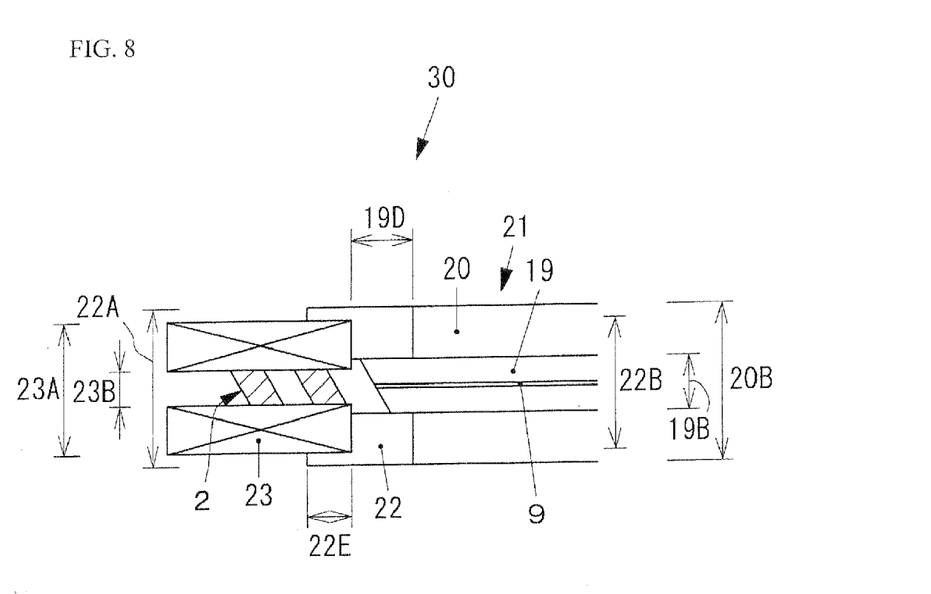
FIG. 8 is a schematic view illustrating still another example of the conventional receptacle attached with an optical isolator.

As shown in FIG. 8, there is disclosed a receptacle attached with an optical isolator, where positioning of the optical isolator can be performed without use of a specific part (Patent Document 3).

[Patent Document 3] Japanese Patent Application Publication No. 2001-215354 (Pages 5-6, FIG. 4)

In the receptacle 30 attached with an optical isolator shown in FIG. 8, at least one end surface of an optical fiber 9 is made of a ferrule 21 comprised of two types of materials 19 and 20, a concentric step difference 19D is provided between the different types of materials, machining end surface which is larger than an outer diameter 19B of the step difference portion and smaller than an outermost diameter 20B of the ferrule is provided to the side of the ferrule 21, positioning is determined at a ferule step difference at an adhering/fixing time, a guide plate 22 that is a step-difference absorption means for the ferrule 21 is disposed, a magnet 23 is adhered and fixed to an opposite side of an adhering surface of the ferrule, a cylindrical pocket or an optical device inserting rectangular pocket where an inner diameter 233 of the magnet is larger than an outermost diameter of an optical isolator element 2 is provided, and the optical isolator element 2 is fixed to the magnet 23.

In this case, in the guide plate 22, a shape of the opposite side of the ferrule adhering surface has a step difference portion 22E having an outer diameter 22A smaller than the outermost diameter 20B of the ferrule and an inner diameter 22B larger than the outer diameter 23A of the magnet, the magnet 23 is fixed on the step difference portion, a cylindrical pocket or an optical device inserting rectangular pocket where the inner diameter 23B of the magnet is larger than the outermost diameter of the optical isolator element 2 is provided, and the optical isolator element 2 is fixed to the magnet 23.

In this manner, the step difference is removed by fitting the metal guide plate 22 into the step difference portion of the ferrule and adhering the ferrule, the step difference portion 22E receiving the magnet is formed on the other end portion, and the magnet 23 is adhered and fixed. In addition, positioning of the optical isolator element 2 can be easily performed.

As described above, in the receptacle attached with an optical isolator, a general-purpose product which does not require a specific shape and machining is used, so that shapes of components of the optical isolator can be simplified. Therefore, a degree of freedom can be increased in design of size of the optical isolator, positioning of parts at an assembling process can be easily performed with a low cost, and a strength of adhering and fixing can be increased.

Figure 9:
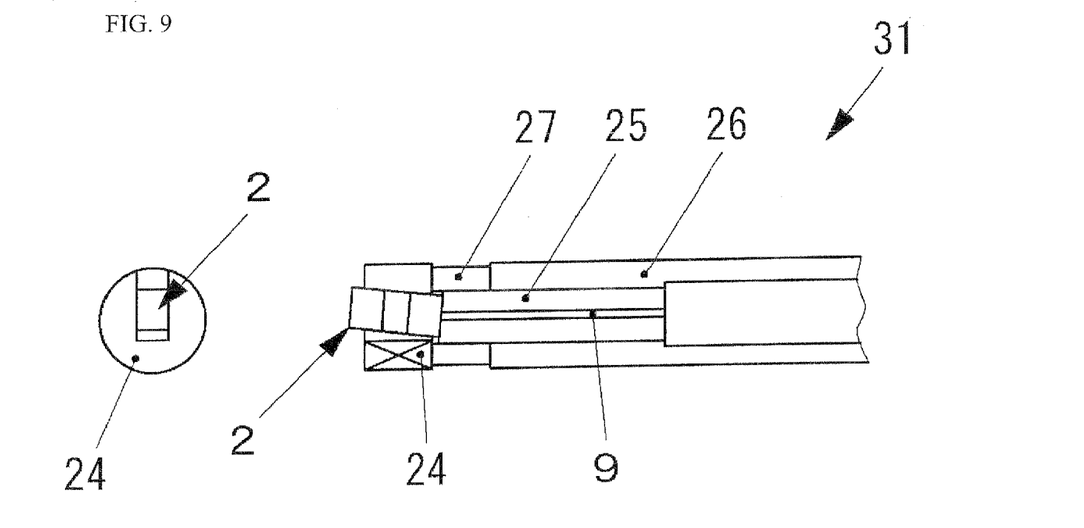
FIG. 9 is a schematic view illustrating further still another example of the conventional receptacle attached with an optical isolator.

In addition, as shown in FIG. 9, there is disclosed a receptacle attached with an optical isolator where positioning of an optical isolator element is preformed by forming a magnet and disposing the optical isolator element on a machining plane of the magnet (for example, refer to Patent Document 4).

[Patent Document 4] Japanese Patent Application Publication No. H11-167085 (Pages 3-4, FIG. 5)

In the receptacle 31 attached with an optical isolator shown in FIG. 9, a fluted column-shaped magnet 24 which is obtained by forming a groove on a column-shaped magnet in a direction from a side-surface side to a column axis is used as a magnet for applying a magnetic field to a Faraday rotator of an optical isolator element 2. In the optical isolator, the optical isolator element 2 is disposed in the groove of the fluted column-shaped magnet 24. In the receptacle attached with an optical isolator, firstly, an optical fiber 9 is fixedly adhered to a ferrule 26 where a fiber stub 25 made of zirconia is pressed and inserted to stainless, and a slant polishing process is performed on a protruding end surface of the fiber stub 25 to form a slant of 6°.

Next, an epoxy adhesive is applied on the polished end surface of the fiber stub 25, and the optical isolator element 2 is disposed at a predetermined position. Next, by curing the epoxy adhesive, the optical isolator element 2 is fixedly adhered on the end surface of the fiber stub 25.

Next, the fiber stub 25 is inserted into a stainless ring 27 and fixedly adhered to the stainless ring 27 by using an epoxy adhesive.

Finally, the fluted column-shaped magnet 24 is fixedly adhered to the stainless ring 27 by using an epoxy adhesive. In this case, since the fluted column-shaped magnet 24 is fixed to a position where the groove forming direction for the groove matches with the slated direction of the optical isolator element 2, the optical isolator element 2 cannot be in contact with an inner wall of the fluted column-shaped magnet 24.

Therefore, if the fluted column-shaped magnet 24 is fixed prior to the optical isolator element 2, it is possible to easily perform a positioning process and a fixing process for the optical isolator element.

In addition, in FIGS. 6 to 9, the same elements are denoted by the same reference numerals.

DISCLOSURE OF THE INVENTION

Problem to Be Solved

However, in the constructions of the receptacles attached with an optical isolator disclosed in Patent Documents 1 and 2, since the fitting of the outer circumference of the magnet is not used for the fixing of the optical isolator element on the end surface of the fiber stub, an epoxy-based organic adhesive is used for the adhering and fixing of the optical isolator element on the fiber stub. In this case, after a dump heat test, insertion loss of a portion of the receptacle attached with an optical isolator is changed and deteriorated.

In addition, in a case where an epoxy-based organic adhesive is used for adhering a cylindrical magnet to the receptacle, an adhering strength of the adhesive is decreased due to the dump heat test, so that the magnet may be detached.

In addition, in the constructions of the receptacles attached with an optical isolator disclosed in Patent Documents 1 and 2, an outer shape of the magnet is of a cylinder and an end surface of the magnet is formed to be perpendicular to an axial direction of the magnet, so that a positioning process for a polarization plane of a polarizer with respect to an slanted angle of the end surface of the fiber stub is additionally needed after the fixing of the optical isolator on the end surface of the fiber stub.

In addition, in the receptacle attached with an optical isolator disclosed in Patent Document 3, since additional parts such as a guide plate are needed, the number of parts of the receptacle attached with an optical isolator is increased, and thus, a production cost is increased.

In addition, in the receptacle attached with an optical isolator disclosed in Patent Document 4, since the end surface of the magnet is formed not to be slanted but to be perpendicular to the axial direction of the magnet, the positioning process for the polarization plane of the polarizer with respect to the slanted angle of the end surface of the fiber stub is difficult at the time of fixing the optical isolator on the end surface of the fiber stub.

In consideration of the aforementioned problems, an object of the present invention is to provide a receptacle attached with an optical isolator capable of easily positioning an end surface of a magnet, an end surface of a fiber stub, and a polarization plane of a polarizer and calculating a size of an optical isolator without an increase in the number of parts and a manufacturing method thereof.

Means for Solving the Problems

According to claim 1 of the present invention, there is provided a receptacle attached with an optical isolator, wherein a fiber stub into which an optical fiber is inserted and of which end surface is formed to be slanted with a predetermined angle is fitted into a ferrule holder, and the optical isolator formed by fixing an optical isolator element to a magnet of which end surface is formed to be slanted with the same angle as the predetermined angle is fitted into an inner diameter portion of the ferrule holder, so that the optical isolator is integrally fixed to the end surface of the fiber stub.

According to claim 2 of the present invention, there is provided a method of manufacturing a receptacle attached with an optical isolator, the method comprising steps of: forming an end surface of a fiber stub into which the optical fiber is inserted to be slanted with a predetermined angle and fitting the fiber stub into a ferrule holder; machining a magnet having an outer diameter slightly smaller than an inner diameter of the ferrule holder by using a dicing saw with a blade having an edge angle so that an optical isolator element is disposed at a predetermined position; cutting the magnet by using a wire saw or a dicer so that the magnet has the same angle as the predetermined angle with respect to a plane perpendicular to an axial direction of the magnet; fixing non-optical planes of the optical isolator element on machining planes of the magnet; and integrally fixing the optical isolator to the receptacle by fitting the magnet into an inner diameter portion of the ferrule holder.

Effects of the Invention

In the receptacle attached with an optical isolator element according to the present invention, the magnet is formed to have the machining plane and the slanted end surface, and the end surface of the fiber stub is also formed to have the same angle as the end surface of the magnet. Therefore, position alignment among the non-optical planes of the optical isolator that are planes to be mounted on the machining planes, the end surface of the magnet, and the end surface of the fiber stub can be performed by simply fixing the magnet constituting the optical isolator on the end surface of the fiber stub. Therefore, angle and position alignment between the polarization plane of the polarizer constituting the optical isolator element and the end surface of the fiber stub can be performed by simply mounting the optical isolator element on the magnet.

In addition, a standard thereof is originally established in accordance with JIS (Japanese Industrial Standards) standard or IEC (International Electro-technical Commission) standard, and in order to ensure a high reliability, the optical isolator is fixedly fitted into the receptacle constructed with highly accurate parts, so that optimal dimension of the optical isolator element and the magnet constituting the optical isolator can be calculated without additional machining or a new part. Therefore, the number of parts and the production cost of the receptacle attached with an optical isolator can be reduced.

In addition, since the magnet is fixed to the end surface of the fiber stub by fitting an outer circumference of the magnet into the ferrule holder, the magnet cannot be detached from the receptacle even in a case where an adhesion strength of an adhesive is somewhat decreased due to the dump heat test or the like. Therefore, a change in insertion loss of the receptacle attached with an optical isolator after the dump heat test can be prevented.

In addition, since the outer circumference of the magnet is fitted into an inner diameter portion of the ferrule holder with a high accuracy, positioning of the polarization plane of the polarizer and the end surface of the fiber stub can be performed with a high accuracy. It is possible to provide a reliable, highly-accurate receptacle attached with an optical isolator without position variation of the magnet or the optical isolator element.

BRIEF DESCRIPTION OF THE DRAWINGS

FIG. 1 (a) is a front view illustrating a receptacle attached with an optical isolator according to the present invention. FIG. 1 (b) is a side cross-sectional view taken along line A-A of FIG. 1 (a).

FIG. 2 (a) is a front view illustrating a structure of the receptacle attached with an optical isolator of FIG. 1. FIG. 2 (b) is a side cross-sectional view taken along line B-B of FIG. 2 (a).

FIG. 4 (a) is a front view illustrating a receptacle attached with an optical isolator according to the present invention. FIG. 4 (b) is a side cross-sectional view taken along line C-C of FIG. 4 (a).

FIG. 7 (a) is a schematic perspective view illustrating another example of the conventional receptacle attached with an optical isolator. FIG. 7 (b) is a side cross-sectional view taken along line D-D of FIG. 7 (a).

REFERENCE NUMERALS

1: magnet
2: optical isolator element
4: ferrule holder
5, 25: fiber stub
7, 28, 29, 30, 31: receptacle
8: air layer
9: optical fiber
10: split sleeve
11: sleeve holder
12, 15, 18, 23, 24: magnet
13, 14: blade
16, 17: adhesive
19, 20: two types of materials
19B: outer diameter of step difference portion
19D: concentric step difference
20B: outermost diameter of ferrule
21: ferrule
22: guide plate
22A: outer diameter of guide plate
22B: inner diameter of step difference portion
22E: step difference
23A: outer diameter of magnet
23B: inner diameter of magnet
26: ferrule
27: stainless ring

BEST MODE FOR CARRYING OUT THE INVENTION

Figure 1:
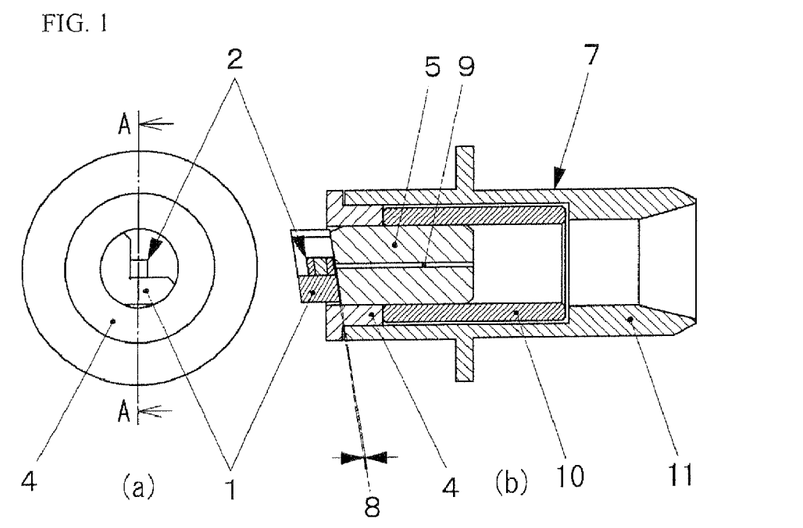
Figure 2:
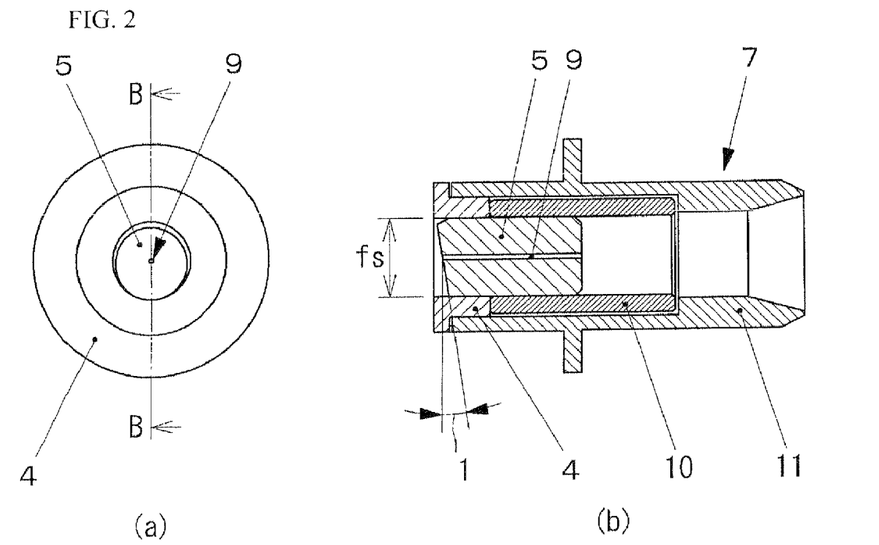
Figure 3:
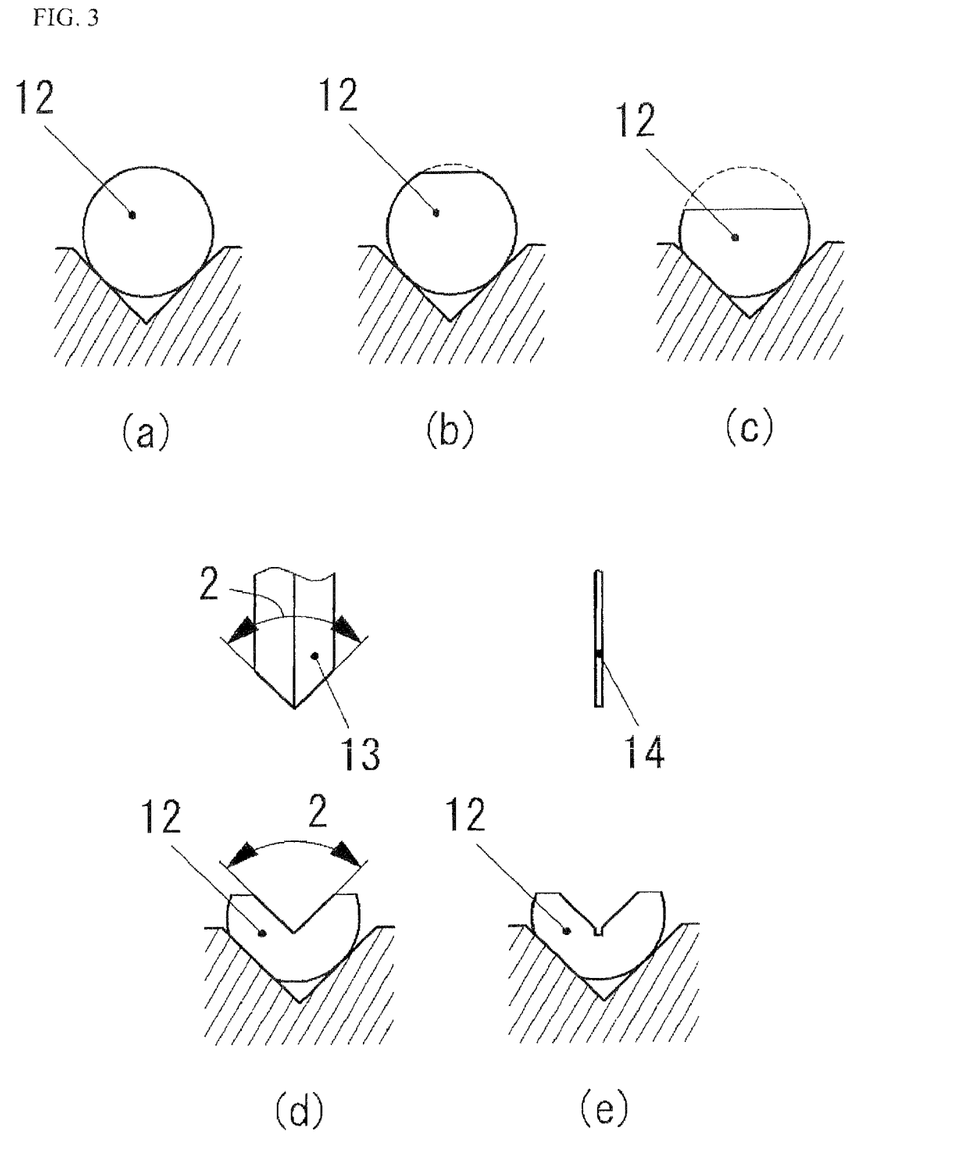
FIG. 3 is a schematic view illustrating an example of a method of manufacturing a magnet of a receptacle attached with an optical isolator according to the present invention.
Figure 4:
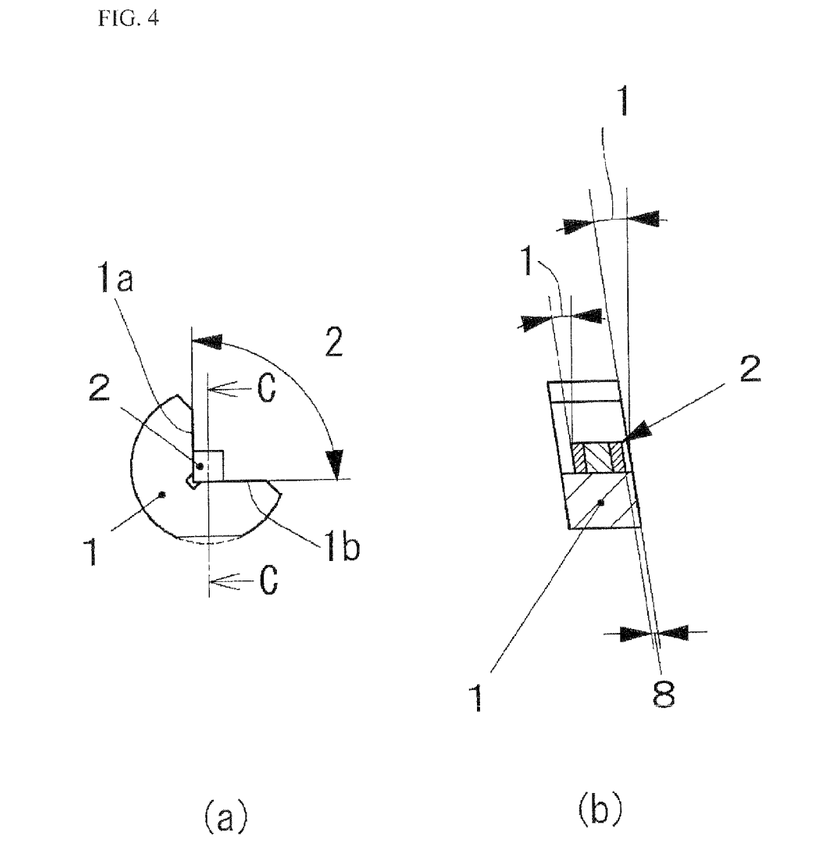
Figure 5:
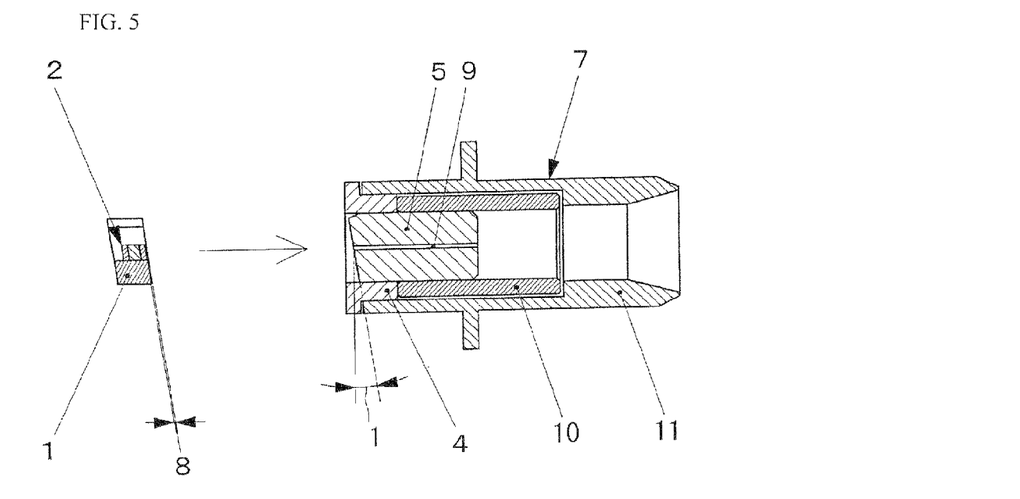
FIG. 5 is a schematic view illustrating an example of a method of fixing an integrated part of an optical isolator element and a magnet to a receptacle attached with the optical isolator according to the present invention.

Hereinafter, embodiments of a receptacle attached with an optical isolator according to the present invention will be described in detail with reference to FIGS. 1 to 5. FIG. 1 (a) is a front view illustrating a receptacle attached with an optical isolator according to the present invention, and FIG. 1 (b) is a side cross-sectional view taken along line A-A of FIG. 1 (a). FIG. 2 (a) is a front view illustrating a structure of the receptacle attached with the optical isolator, and FIG. 2 (b) is a side cross-sectional view taken along line B-B of FIG. 2 (a). FIG. 3 is a schematic view illustrating an example of a method of manufacturing a magnet of a receptacle attached with an optical isolator according to the present invention. FIG. 4 is a schematic view illustrating an example of a method of fixing an optical isolator element to a magnet in a receptacle attached with the optical isolator according to the present invention. FIG. 5 is a schematic view illustrating an example of a method of fixing an integrated part of an optical isolator element and a magnet to a receptacle attached with the optical isolator according to the present invention. The same elements as those of a conventional receptacle attached with an optical isolator are denoted by the same reference numerals, and description thereof is to be omitted or simplified.

As shown in FIG. 2, the receptacle 7 includes a ferrule made of a ceramic material such as zirconia and having an inner hole at a center thereof, a fiber stub 5 constructed with an optical fiber 9 which is inserted into the inner hole and fixedly adhered thereto, a ferrule holder 4, a split sleeve 10 having a sufficient elasticity, and a sleeve holder 11. The fiber stub 5 and the ferrule holder 4 are fixedly fitted together by pressing, and the ferrule holder 4 and the sleeve holder 11 are also fixedly fitted together by pressing.

An end surface of the optical fiber 9 facing the optical isolator described later, together with the ferrule, is subject to slant polishing to form a mirror plane having a predetermine angle $\theta 1$ ranging from 4° to 15° (most preferably, 8°) with respect to a plane perpendicular to an incident axis of an optical signal in order to prevent reflection on the end surface. In addition, the other end surface of the optical fiber 9 is subject to polishing to form a convex spherical plane used for PC (physical contact) connection using a core of the optical fiber 9 as a center thereof.

An outer diameter $\phi$ fs of the fiber stub 5 for connection to an SC connector is about $\phi$ 2.5 mm, and an outer diameter $\phi$ fs of the fiber stub for connection to an LC connector is about $\phi$ 1.25 mm. The receptacle is formed in accordance with the JIS standard or the IEC standard. In order to ensure a high reliability, the optical fiber 9, the fiber stub 5, and the sleeve holder 11 are formed with a high accuracy of dimension thereof.

Now, a method of manufacturing an optical isolator will be described with reference to FIG. 3. Firstly, a non-magnetized cylindrical magnet 12 having a desired outer diameter and a magnetization direction parallel to the axial direction is prepared. The axial-direction length of the magnet 12 is defined to be lager than that of the magnet required when the magnet is assembled into the receptacle. In case of a receptacle attached with an optical isolator used for the SC connector, the outer diameter of the cylindrical magnet 12 is defined to be slightly smaller than an outer diameter (φ 2.5 mm) of the ferrule holder 4. On the other hand, in case of a receptacle used for the LC connector, the outer diameter of the magnet 12 is defined to be slightly smaller than an outer diameter (φ 1.25 mm) of the ferrule holder 4. The magnet 12 can be a sintering product of a samarium-cobalt magnet or a neodymium-iron-boron magnet.

Next, as shown in FIG. 3 (a), the magnet 12 is temporarily fixed to a jig having a shape of V groove by using wax or the like. After that, as shown in FIG. 3 (b), a portion of an outer circumference of the magnet 12 is grinded to form a grinded surface. Next, as shown in FIG. 3 (c), in order to match the grinded surface of the magnet 12 with one surface of the jig having the shape of V groove, the magnet 12 is temporarily fixed again by using wax or the like, and the magnet is further grinded to form a grinded surface by a predetermined amount. Next, as shown in FIG. 3 (d), the magnet 12 is subject to a machining process using a dicing saw with a blade 13 having a 90° edge so as to have a θ 2=90° shape parallel to the axial direction of the magnet. The 90° shape is formed to have a depth so that the optical isolator element 2 can be disposed at the center of the magnet 12 with reference to the outer circumference. Namely, the position of the center of the magnet 12 with reference to the outer circumference becomes a predetermined position where the optical isolator element 2 is disposed. In addition, the grinding process for one surface of the outer circumference of the magnet 12 shown in FIG. 3 (b) is performed to form a D-cut plane matching with the V-grooved jig. If the magnet 12 is small, the grinding process is unnecessary. In addition, the grinding process for one surface of the outer circumference of the magnet 12 shown in FIG. 3 (c) is performed so as to prevent scratch of the magnet 12. Therefore, the grinding process is not necessarily performed.

In addition, due to the machining for the magnet 12, the blade 13 may be abraded. According to the abrasion, a vertex of the 90° shape of the magnet 12 may not be perpendicular with a high accuracy, so that a roughly processed portion may be formed. Therefore, if needed, as shown in FIG. 3 (e), a separation groove may be formed by using, for example, a flat blade 14 having a width of 0.1 mm and no edge angle.

Next, as shown in FIG. 4, a plurality of magnets 1 are simultaneously obtained by cutting the magnet 12 at a predetermined angle θ1 (=8°) with respect to a plane perpendicular to the axial direction thereof by using a wire saw or dicer (not shown). After that, in order to improve humidity resistance, a surface of the magnet 1 may be plated with nickel or the like.

An optical isolator element 2 having a predetermined size and a predetermined angle θ1 is separately prepared. Preferably, both end surfaces of the optical isolator element 2 which become optical planes are subject to reflection-preventing coating. The coating is performed so as to reduce Fresnel reflection caused from a difference in refractive indices between the polarizer and air.

The optical isolator is constructed by disposing one Faraday rotator having a thickness corresponding to a Faraday rotation angle of 45° at a predetermined wavelength under a saturated magnetic field between polarizers having a difference of about 45° between polarization directions and by disposing the magnet 1 for saturatedly magnetizing the Faraday rotator in the vicinity of the Faraday rotator. A plurality of the polarizers and a plurality of the Faraday rotators are obtained at one time by cutting large-sized substrates. As an example of the large-sized polarizer substrate, used is a flat glass substrate containing dielectric particles and having a function of absorbing and blocking incident light in a polarization direction perpendicular to the polarization direction, for example, a Polarcor™ glass polarizer substrate manufactured by Corning Incorporated. In addition, as an example of the Faraday rotator substrate, used is a single crystal substrate made of a bismuth-substituted rare-earth iron garnet crystals produced through a liquid phase epitaxial growing method. The Faraday rotator substrate has a predetermined thickness in a light propagating direction so as to rotate a polarization direction of an incident light by 45° exactly around an optical axis if a saturated magnetic field is applied in a light incident direction.

Next, as shown in FIG. 4, the magnet 1 and the optical isolator element 2 are fixed to each other by using an organic adhesive (not shown) such an epoxy-based adhesive. More specifically, in the fixing of the optical isolator element 2 to the magnet 1, non-optical planes of the optical isolator element 2 are fixed on machining planes 1a and 1b of the magnet. In addition, the fixing thereof is performed so that a predetermined width between an end surface of the magnet 1 and an end surface of the optical isolator element is maintained. The width 8 is a width of an air gap between the end surface of the optical isolator element 2 and an end surface of a fiber stub 5 in a following assembly process. Provided that a clear aperture can be ensured, the width of the air gap can be freely selected according to a dimension of the optical isolator element. However, a small-sized optical isolator element needs to be provided with a small-width air gap. In addition, the adhesive layer may be applied to one or two of the surfaces of the optical isolator element 2 contacting with the magnet 1. In this case, the organic adhesive should not be applied to an inner portion of the clear aperture of the optical isolator element.

Next, as shown in FIG. 5, the optical isolator constructed by integrating the magnet 1 with the optical isolator element 2 is fixed on an end surface of the fiber stub 5 constituting the receptacle 7. For example, the fixing is performed by using an organic adhesive (not shown). In this case, the adhesive is not applied to a region for the optical fiber 9 of the fiber stub 5 and an inner portion of the clear aperture of the optical isolator element 2. More specifically, a suitable amount of the organic adhesive is applied to an inner diameter portion of the ferrule holder 4 that is a part of the receptacle 7. Next, the magnet 1 of the optical isolator is inserted into the inner diameter portion of the ferrule holder 4 and fixedly adhered thereto. In case of a thermosetting organic adhesive, a thermosetting process needs to be performed in consideration of heat resistance of the receptacle 7 at such a predetermined temperature and for such a predetermined time that the receptacle 7 can resist the heat.

As described above, in the receptacle attached with an optical isolator according to the present invention, the magnet 1 is formed to have the machining planes 1a and 1b that are mounting surfaces for the optical isolator element 2 and the slanted end surface having an angle θ1, and the end surface of the fiber stub 5 is also formed to have the same angle θ1 as the end surface of the magnet 1. Due to the construction, position alignment among the non-optical planes of the optical isolator element 2 that are planes to be mounted on the machining planes 1a and 1b, the end surface of the magnet 1, and the end surface of the fiber stub 5 can be performed by simply fixing the magnet 1 constituting the optical isolator on the end surface of the fiber stub 5. Therefore, angle and position alignment between the polarization plane of the polarizer constituting the optical isolator element 2 and the end surface of the fiber stub 5 can be performed by simply mounting the optical isolator element 2 on the magnet 1.

In addition, a standard thereof is in accordance with JIS standard or IEC standard, and in order to ensure a high reliability, the optical isolator is fixedly fitted into the receptacle constructed with highly accurate parts, so that optimal dimension of the optical isolator element 2 and the magnet 1 constituting the optical isolator can be calculated without additional machining or a new part. Therefore, the number of parts and the production cost of the receptacle attached with an optical isolator can be reduced.

In addition, since the magnet is fixed to the end surface of the fiber stub 5 by fitting an outer circumference of the magnet 1 into the ferrule holder 4, the magnet 1 cannot be detached from the receptacle even in a case where an adhesion strength of an adhesive is somewhat decreased due to the dump heat test or the like. Therefore, a change in insertion loss of the receptacle attached with an optical isolator after the dump heat test can be prevented, so that a receptacle attached with an optical isolator having a high reliability and a high accuracy can be provided.

Next, by magnetizing the magnet 1 in the axial direction, the receptacle attached with an optical isolator according to the present invention shown in FIG. 1 can be obtained.

<Embodiment>

A receptacle attached with an optical isolator according to an embodiment of the present invention shown in FIG. 1 is manufactured. For the comparison, a conventional receptacle attached with an optical isolator shown in FIG. 6 is manufactured.

In the manufacturing of the receptacle attached with an optical isolator according to the embodiment of the present invention shown in FIG. 1 and the conventional receptacle attached with an optical isolator shown in FIG. 6, the receptacle shown in FIG. 2 is used, and a fiber stub constructed with a zirconia ferrule in which a single mode optical fiber is fixedly adhered to an inner hole thereof with an epoxy adhesive is used. In both cases, a rear end surface of the fiber stub is subject to a slant mirror polishing process with a slanted angle of 8° with respect to a plane perpendicular to an optical-signal incident direction, and the other end surface is subject to a PC polishing process. In this case, the receptacle is manufactured for an SC connector. In addition, a ferrule holder made of SUS304 is used. An inner diameter of the ferrule holder is designed with a high accuracy of 2.499+0/−0.01. In addition, a distance from the end surface of the ferrule holder that is a part of the receptacle to the end surface of the slant-polished optical fiber is designed to be 0.26 mm.

In the receptacle attached with an optical isolator according to the embodiment of the present invention shown in FIG. 1, the magnet is designed to be a cylinder having an outer diameter of 2.499−0.019/−0.034 and a length of 10 mm and made of samarium-cobalt. Next, the magnet is grinded by 0.15 mm (D-cut). Next, the magnet is further grinded by 0.82 mm in a direction slanted with an angle of 45° with respect to the D-cut grinded surface. Next, by using a dicing saw with a blade having an edge angle of 90°, grinding is performed with a depth of 0.574 mm from a side ground plane. In addition, at this time, the grinding is performed at a position shift by 0.124 mm from a center of the outer diameter of the magnet in the direction parallel to the ground plane of the D-cut. This is because an optical isolator element having an optical plane having a size of 0.45 mm×0.5 mm is used.

Next, a separation groove is formed in the magnet by using a dicing saw with a flat blade having a width of 0.1 mm and an edge angle of 180°. Next, the magnet is cut to have a length of 1.1 mm and a slanted angle of 8° with respect to a plane perpendicular to the axial direction of the magnet by using a wire saw. Next, an outer circumference of the magnet is plated with nickel having a thickness of about 5 μm.

An optical isolator element having an optical plane having a size of 0.45 mm×0.5 mm and a slanted angle of 8° and having a length of 0.8 mm is used. The optical isolator element is used for a wavelength of 1310 nm. As the optical isolator element, the so-called "one-stage type" optical isolator element is used. That is, one polarizer having a predetermined polarization transmitting direction is adhered and fixed to each side of one Faraday rotator by using an epoxy adhesive and a thermosetting process, so that a laminate-type optical isolator element is formed.

Next, the magnet and the optical isolator element are fixedly adhered to each other with an epoxy adhesive through a thermosetting process so that a distance between the end surface of the magnet and the optical isolator element is maintained to be 0.05 mm. In the adhering process, the adhesive is applied to only one of the two surfaces of the optical isolator element contacting with the magnet.

Next, the epoxy adhesive is also applied to a portion of an inner diameter portion of the ferrule holder that is a part of the receptacle, and an integrated part of the magnet and the optical isolator element is inserted and fixedly adhered thereto. The adhering process is performed under a thermosetting condition of 110□ and 20 minutes in consideration of heat resistance of the receptacle. Next, by magnetizing the magnet in a predetermined direction, the receptacle attached with an optical isolator according the present invention is obtained.

On the other hand, in the conventional receptacle attached with an optical isolator shown in FIG. 6, an optical isolator element having an optical plane having a size of 0.6 mm×0.6 mm and a slanted angle of 8° and having a length of 0.8 mm is used. The optical isolator element is used for a wavelength of 1310 nm. As the optical isolator element, the so-called "one-stage type" optical isolator element is used. That is, one polarizer having a predetermined polarization transmitting direction is adhered and fixed to each side of one Faraday rotator by using an epoxy adhesive and a thermosetting process, so that a laminate-type optical isolator element is formed.

The optical isolator element is fixedly adhered to a rear end surface of the fiber stub of the receptacle by using an epoxy adhesive. In the adhering process, a particular jig is used so that the center of the optical isolator element is aligned with the center of the optical fiber. Next, the cylindrical magnet which has a dimension of outer diameter φ 1.8 mm, inner diameter φ 1 mm, and thickness 0.85 mm and is made of samarium-cobalt and of which outer circumference is plated with nickel having a thickness of 5 μm is fixedly adhered to the end surface of the ferrule holder that is a part of the receptacle by using the epoxy adhesive. Next, by magnetizing the magnet in a predetermined direction, the conventional receptacle attached with an optical isolator is obtained.

Next, 11 receptacles attached with an optical isolator according to the present invention and 11 conventional receptacles attached with an optical isolator are subject to a dump heat test under a condition of 85□, 85% RH, and 2,000 hours.

As a result of measurement of insertion loss before and after the dump heat test, in the receptacles attached with an optical isolator according to the present invention, all of the 11 receptacles are good products. However, in the conventional receptacles attached with an optical isolator, 9 of the 11 receptacles are good products, and the remaining 2 receptacles are defective products. In this case, if the insertion loss after the test with respect to the insertion loss before the test is changed by 0.2 dB or more, the receptacle is determined as a defective product. If the insertion loss after the test with respect to the insertion loss before the test is changed by less than 0.2 dB, the receptacle is determined as a good product.

As shown above, it can be understood that all the receptacles attached with an optical isolator according to the present invention are good products in terms of variation width and have higher reliability than the conventional receptacle attached with an optical isolator.

The receptacle attached with an optical isolator according to the present invention can have a high reliability. This is because the outer circumference of the magnet is fitted into the inner diameter portion of the ferrule holder with a high accuracy and positioning of the polarization plane of the polarizer and the end surface of the fiber stub can be performed with a high accuracy, so that position variation of the magnet or the optical isolator element cannot occur.

Although the above description is made on a receptacle attached with an optical isolator for an SC connector, the present invent is limited thereto. For example, the present invention can be applied to a receptacle attached with an optical isolator for an LC connector.

Industrial Applicability

A receptacle attached with an optical isolator according to the present invention is mainly used as a passive optical device such as an optical communication module, a semiconductor laser module, and an optical amplifier in an optical communication system.

The invention claimed is:

1. A receptacle attached with an optical isolator, wherein a fiber stub into which an optical fiber is inserted and of which end surface is formed to be slanted with a predetermined angle is fitted into a ferrule holder, and the optical isolator formed by fixing an optical isolator element to a magnet of which end surface is formed to be slanted with the same angle as the predetermined angle is fitted into an inner diameter portion of the ferrule holder, so that the optical isolator is integrally fixed to the end surface of the fiber stub.

2. A method of manufacturing a receptacle attached with an optical isolator, the method comprising steps of:
    forming an end surface of a fiber stub into which the optical fiber is inserted to be slanted with a predetermined angle and fitting the fiber stub into a ferrule holder;
    machining a magnet having an outer diameter slightly smaller than an inner diameter of the ferrule holder by using a dicing saw with a blade having an edge angle so that an optical isolator element is disposed at a predetermined position;
    cutting the magnet by using a wire saw or a dicer so that the magnet has the same angle as the predetermined angle with respect to a plane perpendicular to an axial direction of the magnet;
    fixing non-optical planes of the optical isolator element on machining planes of the magnet; and
    integrally fixing the optical isolator to the receptacle by fitting the magnet into an inner diameter portion of the ferrule holder.

* * * * *